US010613962B1

(12) United States Patent
Delange

(10) Patent No.: US 10,613,962 B1
(45) Date of Patent: Apr. 7, 2020

(54) SERVER FAILURE PREDICTIVE MODEL

(71) Applicant: Amazon Technologies, Inc., Seattle, WA (US)

(72) Inventor: Julien Delange, Alameda, CA (US)

(73) Assignee: Amazon Technologies, Inc., Seattle, WA (US)

(*) Notice: Subject to any disclaimer, the term of this patent is extended or adjusted under 35 U.S.C. 154(b) by 105 days.

(21) Appl. No.: 15/795,163

(22) Filed: Oct. 26, 2017

(51) Int. Cl.
G06F 11/34 (2006.01)
G06F 11/07 (2006.01)
G06N 20/00 (2019.01)

(52) U.S. Cl.
CPC ...... *G06F 11/3447* (2013.01); *G06F 11/0709* (2013.01); *G06F 11/0754* (2013.01); *G06N 20/00* (2019.01)

(58) Field of Classification Search
CPC ............ G06F 11/004; G06F 11/0709; G06F 11/0727; G06F 11/0754; G06F 11/757; G06F 11/076; G06F 11/793; G06F 11/2053; G06F 11/2094; G06F 11/20; G06F 11/3006; G06F 11/301; G06F 11/302; G06F 11/3034; G06F 11/3442; G06F 11/3447; G06F 11/3452; G06F 2101/81; G06F 3/0616; G06F 3/0629; G06F 3/0653; G06N 5/00; G06N 5/033; G06N 5/02; G06N 5/025; G06N 5/04; G06N 20/00
See application file for complete search history.

(56) References Cited

U.S. PATENT DOCUMENTS

| | | | | |
|---|---|---|---|---|
| 9,542,296 B1* | 1/2017 | Engers | ............... | G06F 11/3452 |
| 9,621,421 B1* | 4/2017 | Tolentino | ............ | H04L 41/0816 |
| 9,760,428 B1* | 9/2017 | Felstaine | ............... | H04L 41/022 |
| 10,191,668 B1* | 1/2019 | Traylor | ................. | G06F 3/0616 |
| 10,216,558 B1* | 2/2019 | Gaber | ................. | G06F 11/0727 |
| 2003/0204788 A1* | 10/2003 | Smith | .................. | G06F 11/004 714/47.3 |
| 2005/0060618 A1* | 3/2005 | Guha | ..................... | G06F 11/008 714/54 |
| 2008/0250265 A1* | 10/2008 | Chang | ................... | G06F 11/008 714/4.12 |
| 2009/0271657 A1* | 10/2009 | McCombs | ............ | G06F 11/004 714/6.2 |
| 2010/0318837 A1* | 12/2010 | Murphy | ................ | G06F 11/008 714/4.1 |
| 2015/0033081 A1* | 1/2015 | Bickford | ............... | G06F 11/004 714/39 |
| 2015/0205657 A1* | 7/2015 | Clark | .................... | G06F 11/008 714/47.3 |
| 2016/0217025 A1* | 7/2016 | Xia | ....................... | G06F 11/004 |

(Continued)

*Primary Examiner* — Gabriel Chu
(74) *Attorney, Agent, or Firm* — Davis Wright Tremaine LLP

(57) ABSTRACT

A failure prediction subsystem may obtain metrics information from a set of servers, the metrics information including measurements of the operation of the set of servers. The failure prediction subsystem may then determine a mean time between failures for at least one server of the set of servers by at least providing a portion of the metrics information as an input to a machine learning algorithm. The machine learning algorithm may output a mean time between failure for at least one server of the set of servers and the failure prediction subsystem may determine if mitigating action should be taken based at least in part on the mean time between failure.

20 Claims, 8 Drawing Sheets

(56) References Cited

U.S. PATENT DOCUMENTS

| | | | | |
|---|---|---|---|---|
| 2016/0292025 A1* | 10/2016 | Gupta | ............... | G06F 11/076 |
| 2018/0032405 A1* | 2/2018 | Chen | ............... | G06F 11/1451 |
| 2018/0089042 A1* | 3/2018 | Demetriou | ......... | G06Q 10/0631 |

* cited by examiner

SERVER FAILURE PREDICTIVE MODEL

BACKGROUND

Customers of a computing resource service provider may reduce expenses and overhead by using remote program execution and remote data storage services provided by the computing resource service provider. Customer applications may be distributed over multiple virtual machine instances and computing systems. In addition, these computing systems may include various block-level storage devices. In distributed computing environments, however, scalability, availability, durability, and performance are complex problems to solve, especially as the number of devices involved increases. Moreover, the many distributed computer systems involve computing resources that may occasionally fail and/or require repair. Adding to the complexity are differences in devices, such as different disk drives and, generally, differences that introduce additional factors to be taken into account when managing systems. As a result, maintaining scalability, availability, durability, and performance in distributed computing environments with heterogeneous computing resources that may occasionally fail and/or require repair is difficult and complex. In addition, this difficulty and complexity increases with the size of these distributed computing resource environments.

BRIEF DESCRIPTION OF THE DRAWINGS

Various techniques will be described with reference to the drawings, in which.

DETAILED DESCRIPTION

Figure 1:
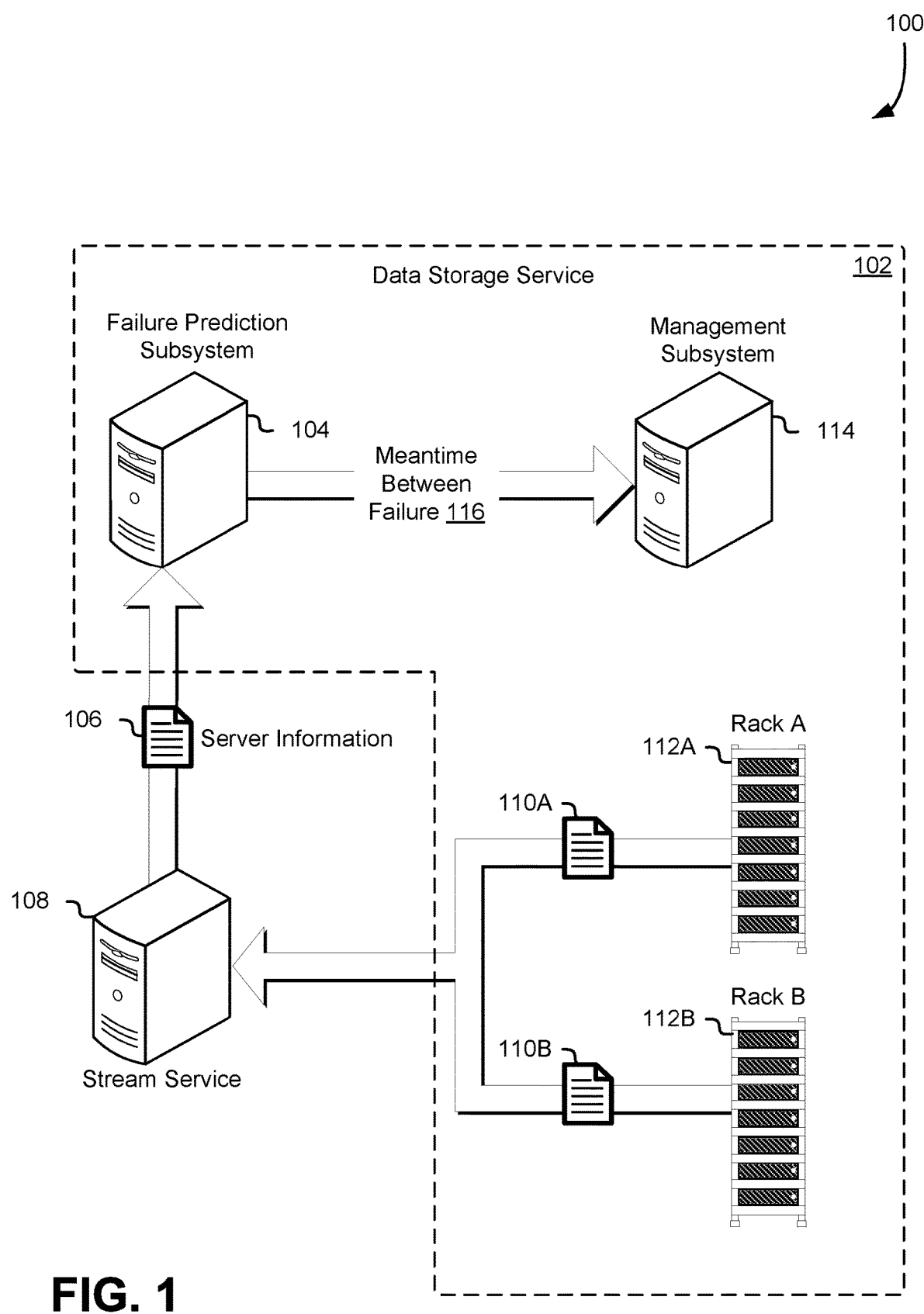
FIG. 1 illustrates an environment in which a failure prediction subsystem determines a Mean Time Between Failure (MTBF) for computing resources of a service in accordance with an embodiment.

Techniques and systems described below relate to predicting a mean time between failures (MTBF) for a server computer system or component thereof and taking appropriate action to avoid impacting users of the server computer system. In one example, a failure prediction subsystem of a data storage service obtains various hardware and software signals from a set of server computer systems and generates an MTBF for each server computer system of the set of server computer systems. The data storage service may provide data storage volumes to customers of a computing resource service provider. The data storage volumes may, for instance, be used to store data for server computer systems also provided by the computing resource service provider.

As described in greater detail below, the failure prediction subsystem may obtain information from the server computer systems and provide the information to be used with a machine learning algorithm and/or predictive model. Use of the machine learning algorithm and/or predictive model, in some examples, returns the MTBF or other information indicating an interval of time during which a particular server computer system or component thereof may fail. The failure prediction subsystem may use a variety of different hardware and software information as inputs to the machine learning algorithm and/or predictive model. Hardware signals, for instance, may include server temperature, processor temperature, disk drive temperature, processor load, memory usage, memory error rate, disk read and/or write latency, seek time, network latency, or any other metric or measurable attribute of a server computer system or component thereof. Software signals include end-to-end latency, error rate, kernel error, processor load, memory load, or any other metric or measurable attribute of an application and/or software executed by a server computer system.

In various examples described in greater detail below, the failure prediction subsystem obtains logs (e.g., operational information generate by software and hardware) of the server computer systems to train the machine learning algorithm used by the failure prediction subsystem to predict hardware failures. As described in greater detail below, the machine learning algorithm may be used to generate a predictive model that can be provided as and input metrics (e.g., hardware and software metrics) and output information indicating a point in time that particular computing resources may fail. The logs may contain the historical performance of the server computer systems implementing the data storage service including when particular service computer systems failed and/or needed to be replaced or repaired. These logs may provide a training data set which is used by the failure prediction subsystem to train a machine learning algorithm such as a Bayesian network or decision tree described in greater detail below. Furthermore, in some example, the hardware and software signals are both included as inputs the machine learning algorithm (e.g., correlated by the machine learning algorithm) to provide a more accurate MTBF. The hardware and software signals may be provided as integer values or other real numbers as inputs to the machine learning algorithm and the machine learning algorithm may return a value representing the MTBF for a particular server computer system or component thereof associated with the inputs.

If the MTBF is within a value relative to a threshold, the data storage service or component thereof such as a management subsystem may execute one or more mitigating actions. In one example, if the MTBF is 900 seconds and it takes 800 seconds to repair and/or replace a server computer system or a component of the server computer system (e.g., a particular hard disk drive that is predicted to fail), the management subsystem then executes a workflow or other process to decommission the server computer system and replace and/or repair the server computer system. In yet another example, if the predicted MTBF changes by more than 50% over an interval of time or over multiple predictions generated by the machine learning algorithm, the management subsystem then executes a workflow or other process to decommission the server computer system and replace and/or repair the server computer system. The failure prediction subsystem, machine learning algorithm, and predictive model can be used to predict hardware and/or software failures of server computer systems and components thereof (e.g., memory, processors, hard disk drive, application, etc.) for a variety of different services and server computer systems.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an environment 100 in which a failure prediction subsystem 104 of a data storage service 102 generates predictions for various aspects, such as a mean time between failure 116, of one or more computing resources in accordance with an embodiment. In various embodiments, a computing resource service provider operates one or more data centers including physical computing resources as described in greater detail below in connection with FIG. 4. These computing resources may be provided to customers, services (e.g., the data storage service 102), and other entities. In various embodiments, the failure prediction subsystem 104 utilizes a machine learning algorithm to generate a predictive model used to determine a mean time between failure 116 (MTBF) for particular computing resources. The failure prediction subsystem 104 including the machine learning algorithm and/or predictive model, in various embodiments, includes software, logic, or other executable code that, when executed by computing resources of the computing resource service provider, causes the computing resources to determine the MTBF 116 and performs other operations as described in greater detail below. In one example, the failure prediction subsystem 104 includes a computer system comprising one or more processors and memory storing executable instructions that, if executed, cause the computer system to perform operations as described in the present disclosure. The failure prediction subsystem 104 may be used to generate any information indication a likelihood and/or point in time that computing resources may fail. One example of such information includes the MTBF as described above.

Furthermore, the failure prediction subsystem 104, as illustrated in FIG. 1, is a component of the data storage service implemented by server computer systems in a data center operated by the computing resource service provider. The data storage service 102 may provide customers of the computing resource service provider with logical volumes which may be used to store blocks of data on behalf of the customer. Although FIG. 1 illustrates the data storage service 102, the techniques described in the present disclosure of determining an MTBF 116 for computing resources and performing mitigating actions may be used in connection with any service or any computing resources. In one example, the failure prediction subsystems 104 determines the MTBF 116 for computing resources provided to customers that use the computing resources to perform computational tasks, storage operations, execute applications, or generally leverage the computing resources to perform various tasks. As described in greater detail below, the computing resources provided by the computing resource service provider may include processing units, storage devices, network appliances, or other devices to support the executing of customer applications and/or tasks. Furthermore, the computing resources may include virtualized computing resources such as virtual machines, virtual storage devices, or any other computing resources capable of being virtualized.

Returning to FIG. 1, a set of racks 112A-112B (e.g., rack A and rack B) contain physical computing resources which are used to provide computing resources as described in the present disclosure. The set of racks 112A-112B may include any computing resources used to execute an application, storage data, implement a network, or other task on behalf of the customer or service. Furthermore, the set of racks 112A-112B may include computing resources provided by the computing resource service provider and/or customer. In one example, a portion of the set of racks 112A-112B is provided by the customer in an on-premises data center (e.g., a data center operated by the customer) and another portion of the set of racks 112A-112B is provided by the computing resource service provider (e.g., the data storage service 102). For the purposes of the present disclosure the set of racks 112A-112B may include computing resources entirely provided by the computing resource service provider or the customer. In embodiments, where the set of racks 112A-112B are provided by the customer, the customer provides the failure prediction subsystem 104 with access to aggregated server information 106 generated by the computing resource within the set of racks 112A-112B. In one example, the customer executes an agent or other component of the failure prediction subsystem 104 responsible for transmitting aggregated server information 106 to the failure prediction subsystem.

In various embodiments, the data storage service 102 includes a front-end server (not shown in FIG. 1 for simplicity), which obtains the aggregated server information 106 from a variety of different sources, including directly from computing resources within the set of racks 112A-112B, various other services of the computing resource service provider, and computing resources made available to the customers through the various services. As illustrated in FIG. 1, a stream service 108 obtains metrics information 110A-110B from the set of racks 112A-112B and provides aggregated server information 106 to the data storage service 102 or component thereof such as the failure prediction subsystem 104. The stream service 108, in various embodiments, includes software, logic, or other executable code that, when executed by computing resources of the computing resource service provider, causes the computing resources to aggregate the metrics information 110A-110B and provide the server information 106 to the failure prediction subsystem 104. In various embodiments, the stream service 108 creates a data stream from the metrics information 110A-110B to which the failure prediction subsystem 104 subscribes. In yet other embodiments, the stream service 108 periodically or aperiodically obtains the metrics information 110A-110B from the set of racks 112A-112B and places the metrics information 110A-110B in a storage location accessible to the failure prediction subsystem.

In one example, the metrics information 110A-110B is obtained from a storage server included in the set of racks 112A-112B that provides a customer operated virtual machine with access to a logical volume. The metrics information 110A-110B, as described in the present disclosure, may include log data, real-time data, detected values, or other information indicating operational information obtained from the computing resources including information obtained by obtaining various measurements from the computing resources (e.g., utilization, temperature, rate of change, etc.). In one example, the metrics information 110A-110B includes a measurement of the amount of memory consumed by the computing resources. In another example, the metrics information 110A-110B includes a measurement of the seek time of a hard disk drive. In yet another example, the aggregated server information 106 includes central processing unit (CPU) usage information with sub-second granularity obtained from millions of computers systems in a fleet (e.g., the set of racks 112A-112B). In a final example, the metrics information 110A-110B includes a measurement an error rate of software executed by the computing resource. As described in the present disclosure, the metrics information 110A-110B includes a variety of information associated with the physical hardware and software of the set of racks 112A-112B.

The metrics information obtained by the stream service 108 and provided to the failure prediction subsystem, in various embodiments, is stored in a data store, used to train the machine learning algorithm, and/or used to determine and/or update an MTBF 116. In various other embodiments, the metrics information (e.g., the aggregated server information 106 and/or the metrics information 110A-110B) is obtained as a stream of data, for example, from the stream service 108 without being stored in the data store. In such embodiments, the data obtained from the stream service 108 may only be used to determine and/or update an MTBF 116. In yet other embodiments, the data store is a repository for maintaining metrics data including time series metrics data (e.g., data indicating a measurement of the computing resources and/or MTBF 116 over an interval of time).

As described above, the aggregated server information 106 may include measurements obtained from computational resources such as activity volume, latencies, error rate, temperature, and resource utilization. In various embodiments, activity volume includes measuring aggregate activity of a service, such as order rates of an online retailer, data volume activity as indicated in various logs, or a number of connections for networking appliance. In other embodiments, latency includes process time between two expected and defined incidences indicating a process and/or duration of performing particular tasks. For example, service call response time, ping response time on networks, or order process times at the online retailer, seek time for a hard disk driver. In yet other examples, utilization includes consumptions of capacity aggregated by type of computing resources, such as CPU utilization or memory consumption. Furthermore, as described in the present disclosure, the metrics information 110A-110B can be aggregated over time and may be stored in the data store and/or used to train a machine learning algorithm of the failure prediction subsystem 104.

As described in greater detail below, the failure prediction subsystem 104 uses at least a portion of the aggregated server information 106 as inputs to the predictive model. The predictive model then outputs the MTBF 116 for various computing resources of the set of racks 112A-112B. In various examples, server information (e.g., metrics information 110A-110B obtained from a particular server computer system within the set of racks 112A-112B) such as temperature, memory consumption, error rate, latency (e.g., end-to-end software latency), number of memory errors, and number of hardware errors are provided as input values (e.g., integer or float values) to the predictive model of the failure prediction subsystem 104. The predictive model, in these examples, then outputs an MTBF 116 in seconds for the particular service computer system and the failure prediction subsystem 104 then provides the MTBF 116 to a management subsystem 114 described in greater detail below in connection with FIG. 3.

As described in greater detail below in connection with FIG. 6, the management subsystem 114 may perform or caused to be performed one or more mitigating operations. In one example, in response to the MTBF 116, the management subsystem 114 causes the server computer system to be decommissioned so that the server computer system or component thereof (e.g., hard disk drive, memory, processor, network card, etc.) can be replaced and/or repaired. In another example, the management subsystem 114 causes software executed by server computer system to be updated, rolled back, or otherwise modified in response to the MTBF 116.

In various embodiments, the management subsystem 114 determines whether to perform mitigating operations based at least in part on the MTBF 116 and the time required to complete the mitigating operations. In one example, 60 seconds is required to decommission a server computer system and if the MTBF 116 is within a threshold relative to the 60 seconds, the management subsystem 114 decommissions the server. In yet other embodiments, the management subsystem 114 performs mitigating operations based at least in part on an amount of change in the value of the MTBF 116. In one example, the management subsystem performs mitigating operations in response to the MTBF 116 dropping by more than 50 percent between successive determinations. As described in the present disclosure MTBF 116 may be determined for a component of a server computer system such as a hard disk drive or the server computer system itself.

Figure 2:
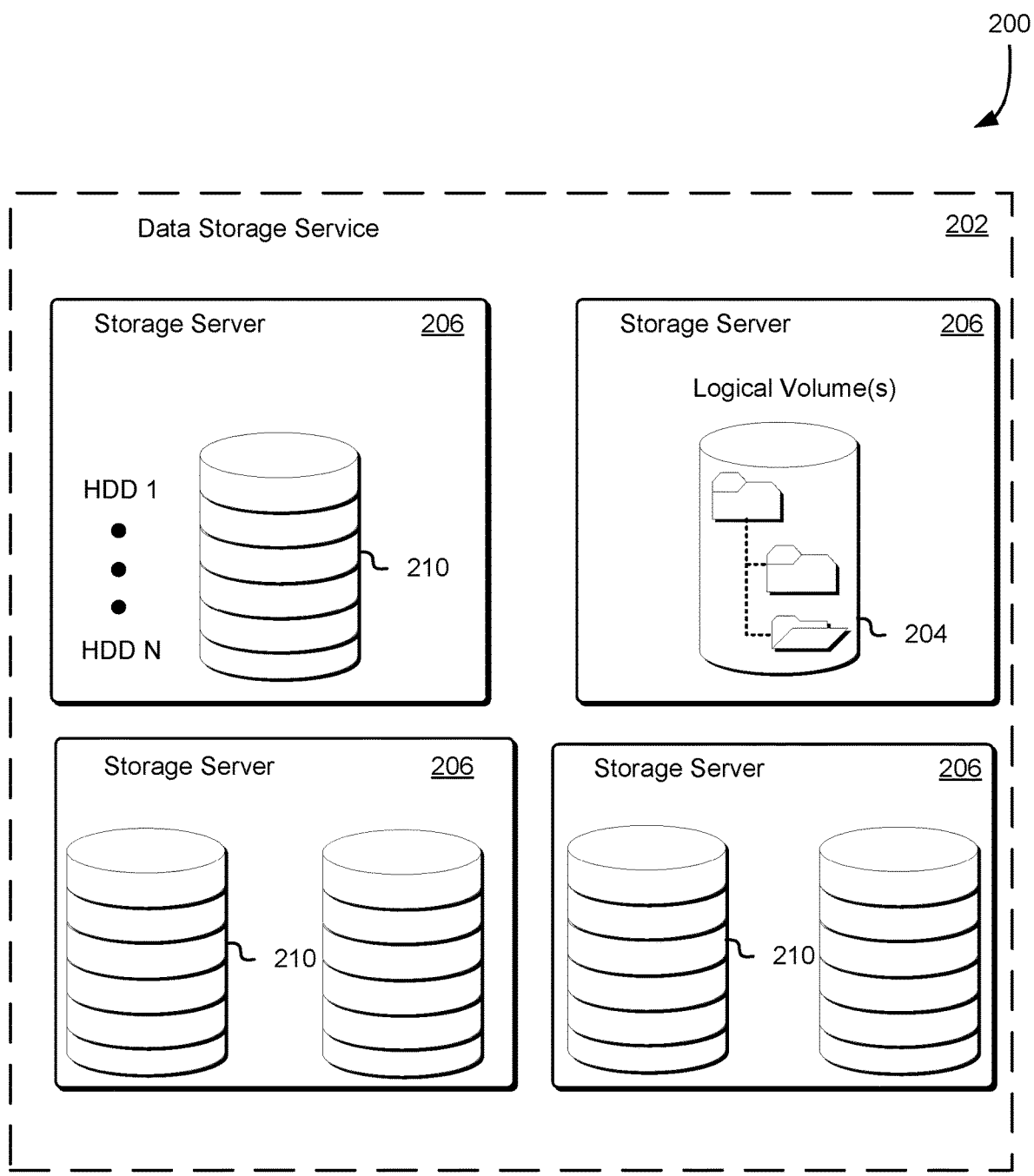
FIG. 2 illustrates an example of storage nodes of a data storage service in accordance with an embodiment.

FIG. 2 illustrates an example environment 200 where one or more computer systems, as well as the executable code running thereon, may provide customers with logical volumes 204 wherein the logical volume may be maintained by a data storage service 202 using a storage server 206. The data storage service 202, in various embodiments, is one service of a set of services provided to customers by a computing resource service provider. As described in greater detail below, the data storage service 202 provides customers with logical volumes 204 using computing resources of one or more storage servers 206 such as a server computer system. The customer may use these logical data storage volumes to store blocks of data. Furthermore, in some examples, the data storage service comprises a plurality of server computer systems including storage devices (e.g., hard disk drives) that provide the logical data storage volumes to the customers. These server computer systems may execute various software applications to provide the logical data storage volumes to the customers.

Customer data may be stored across a variety of different data storage servers 206 containing one or more storage devices such as block-level storage devices, illustrated in FIG. 2 as hard disk drives (HDDs) 1 through N 110. The customer data stored on the different devices may be exposed to a computer system operated by the customer and include a logical volume 204. Described in greater detail below, the customer may instantiate one or more virtual machines on computing resources of the data storage service 202, and then one or more virtual machines may attach the exposed logical volumes 204 to enable the customer to interact with the data stored in the logical volumes 204 maintained by the remote storage service using one or more storage servers 206. The logical volume 204 may contain one or more files which are simultaneously accessible to multiple computer systems operated by customers of the data storage service 202.

As illustrated by FIG. 2 the storage server 206 may include a pool or other collection of storage devices 1 through N configured to store data on behalf of customers of the data storage service 202 or other entities. The hardware configuration of the storage server 206 may include computing resources 210 such as network interfaces, rack, switches, HDDs, solid-state drives or other storage devices, processors, memory, or any other physical component of the storage server 206. The software configuration of the storage server 206 may include logical volume placement algorithms, operating systems, hypervisors, throttling applications, or other applications managing customer access to computing resources of the storage server 206, and any other application loaded into memory of the storage server 206. The storage server 206 may be accessible by an IP address or other network protocol. Example of a storage node is a network (e.g., Ethernet) attached storage (NAS) device, a storage area network (SAN) storage device, or a NAS-SAN hybrid storage device. NAS protocols include network file system (NFS), server message block/common internet file system (SMB/CIFS), and Apple filing protocol (AFP). SAN protocols include a variety of different protocols such as Fibre Channel, iSCSI, AT Attachment over Ethernet (AoE), and HyperSCSI.

As described above, a failure prediction subsystem or stream service may obtain metrics information from the storage server 206 or components thereof such as the computing resources 210. In various embodiments, a first portion of the metrics information is obtained from the storage server 206 and a second portion of the metrics information is obtained directly from the computing resource 210. For example, software metrics information (e.g., latency, kernel errors, etc.) may be obtained from the storage service and hardware metrics information (e.g., temperature, seek-time, etc.) may be obtained from the computing resource 210. Although a storage server 206 is illustrated in FIG. 2, various different types of server computer systems may be used in connection with the techniques described in the present disclosure.

Figure 3:
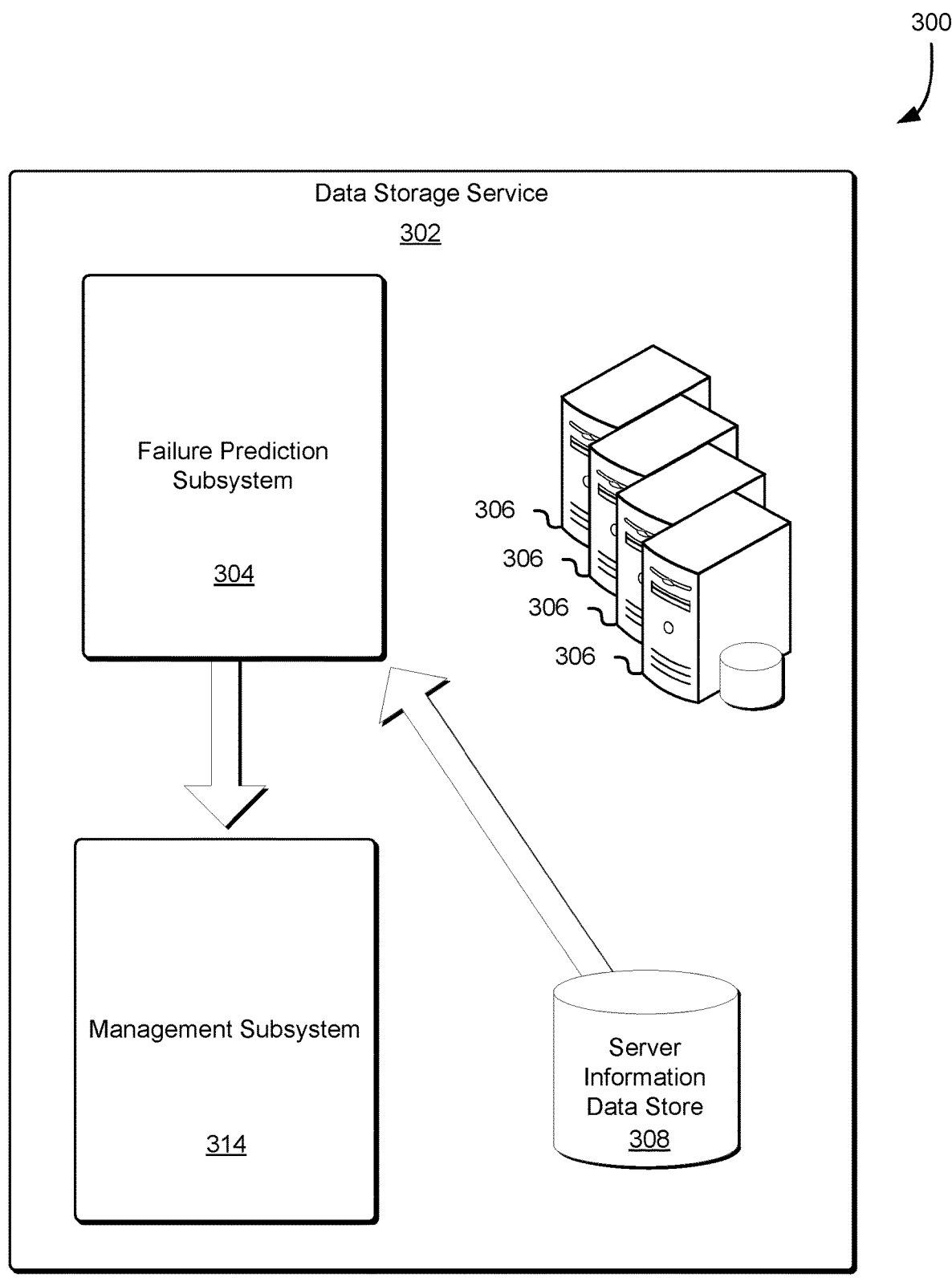
FIG. 3 illustrates an example of a data storage service in accordance with an embodiment.

FIG. 3 shows an illustrative example of an environment 300 which includes a data storage service 302 in accordance an embodiment. The data storage service 302 may be a service of a computing resource provider used to operate a block-level data storage service such as described above in connection with FIGS. 1 and 2. As illustrated in FIG. 3, the data storage service 302 includes various subsystems such as a failure prediction subsystem 304 and a management subsystem 314. The data storage service 302 may also include a plurality of data storage servers 306 and a server information data store 308, which may store metrics information associated with volumes maintained by the data storage servers 306 as well as metrics information of the data storage servers 306 as described above.

In an embodiment, the data storage service 302 includes a request processing subsystem which is a collection of computing resources, such as webservers and application servers, collectively configured to as process requests submitted to the data storage service 302. The request processing subsystem, for example, may include one or more webservers that provide a web service interface to enable customers of the data storage service 302 to submit requests to be processed by the data storage service 302. In various embodiments, the failure prediction subsystem 304 includes executable code or other logic that, when executed by a computer system such as the data storage servers 306, causes the computer systems to perform various operations such as determining an MTBF for a particular computer system as described above.

Components of the failure prediction subsystem 304 may interact with other components of the data storage service 302 (e.g., through network communications). For example, determining an MTBF for a particular computer system may involve obtaining metrics information associated with computing resources of the data storage servers 306. In another example, the failure prediction subsystem 304 may provide the MTBF to computing resources implementing the management subsystem 314. Communication between the various subsystems (e.g., the failure prediction subsystem 304 and the management subsystem 314), in various embodiments, is accomplished by the transmission of requests between the computing resources implementing the various subsystems. Furthermore, in some embodiments, the request processing subsystem may be responsible for receiving requests and directing the requests to the appropriate subsystem.

For example, these requests may be processed by the management subsystem 314 upon receipt by the request processing subsystem. If applicable, various requests processed by the request processing subsystem and/or management subsystem 314 may result in the management subsystem 314 updating metadata associated with the data storage servers 306. For example, if the MTBF failure indicates that a particular data storage server 306 (or component thereof such as a HDD) should be repaired or replaced, the management subsystem 314 may update the metadata associated with the particular data storage server 306 to indicate that the particular data storage server 306 is being decommissioned. Additionally, the management subsystem 314 and failure prediction subsystem 304 may utilize information included in the server information data store 308 to perform various operations described in the present disclosure.

In addition, some requests processed by the request processing subsystem that involve operations on data objects (upload, download, delete, e.g.) may include interactions between the request processing subsystem and one or more data storage servers 306. The data storage servers 306 may be computer systems communicatively coupled with one or more storage devices for the persistence of data objects. For example, in order to process a request to upload a data object, the request processing subsystem may transmit data to a data storage server 306 for persistent storage. It is noted, however, that in some embodiments, client (e.g., customer) computer systems may transmit data directly to the data storage servers 306 instead of through servers in the request processing subsystem.

In some embodiments, data is maintained by multiple data storage servers 306 for the purposes of redundantly storing the data to allow the retrievability of data in the event of failure of an individual data storage server 306 and/or associated data storage device. For example, in some embodiments, logical volumes may include a master volume and a slave volume to provide data redundancy. In such embodiments, decommissioning a particular data storage server 306 includes updating the metadata associated with each logical volume supported by the particular data storage server 306 such that any master volume supported by the particular data storage service 306 is changed to the slave volume and the corresponding slave volume is switched to the master volume. In embodiments, where there is only a single volume (e.g., solo mater volume or no data redundancy is implemented) decommissioning data storage servers 306 includes copying data from the data storage servers 306 to be decommissioned to another data storage server 306.

As described in greater detail below, information maintained in the server information data store 308 may be used to train one or more machine learning algorithms and/or generate one or more predictive models which may be used by the failure prediction subsystem 304 to generate an MTBF. In one example, the server information data store 308 contains historical information (e.g., metrics such as temperature, memory consumption, error rate, etc.) including information indicating when various data storage servers 306 or components thereof failed. This information may be used to train various machine learning algorithm including supervised machine learning algorithms, Bayesian networks, logistic regression, random forests, decision trees, lazy learning algorithms, neural network algorithms, cluster analysis algorithms, hierarchical clustering algorithms, semi-supervised learning algorithms, and any other machine learning algorithm that may be used to predict an MTBF for data storage servers 306 based at least in part on metrics information, including hardware metrics and software metrics, obtained from the data storage servers 306.

Figure 4:
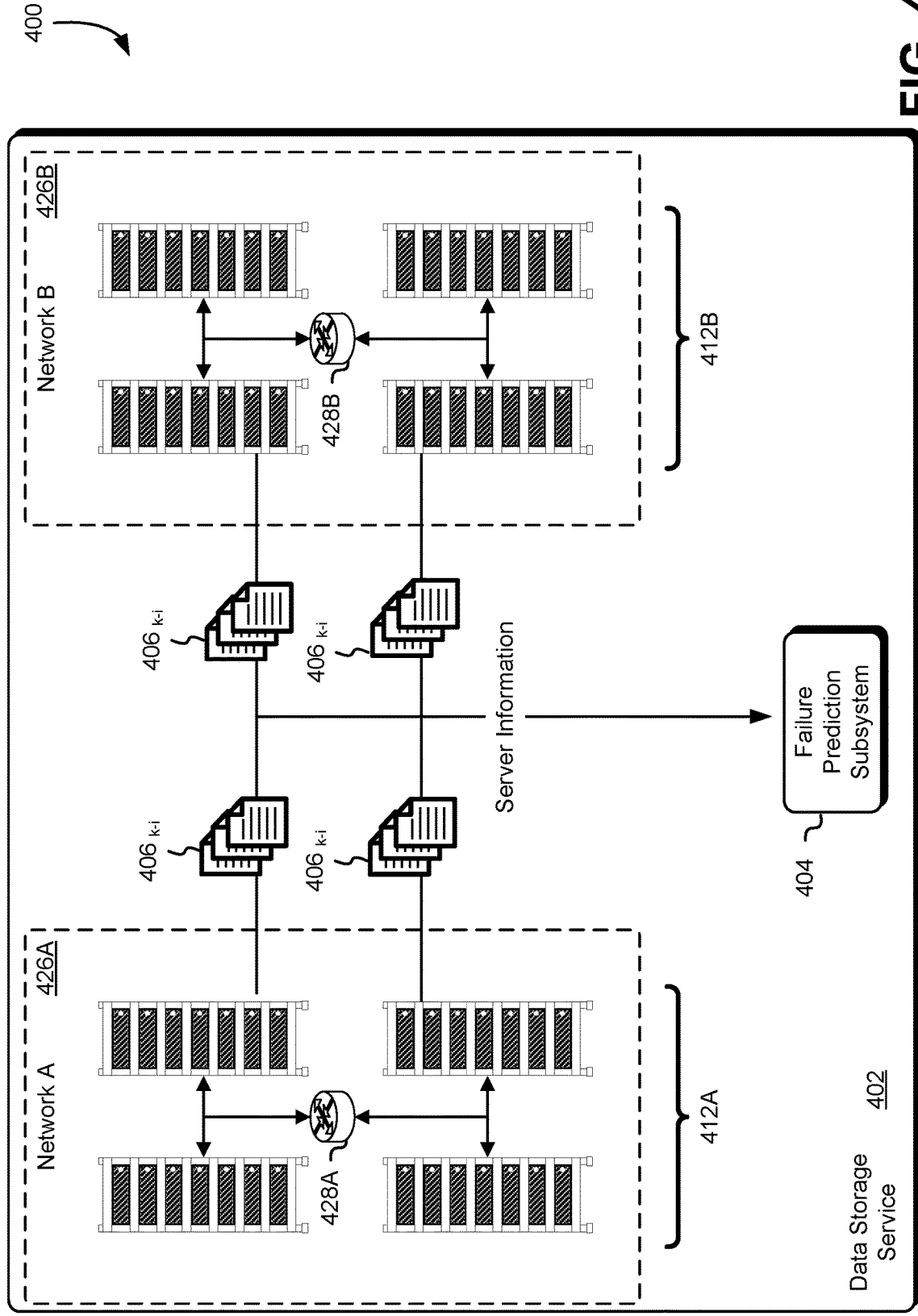
FIG. 4 illustrates an environment in which metrics information is obtained from a set of servers in accordance with an embodiment.

FIG. 4 illustrates an aspect of an environment 400 in which an embodiment may be practiced. Specifically, FIG. 4 depicts the collection and processing of server metrics information 406 by a failure prediction subsystem 404 to enable the failure prediction subsystem 404 to generate a set of MTBFs for computing resources with the servers in sets of racks 412A-412B. The environment 400 includes the failure prediction subsystem 404 of a data storage service 402, as described above, that receives server metrics information 406 from servers or other components of the sets of racks 412A-412B. The data collected by the failure prediction subsystem 404 may include various metrics of the server metrics information $406_{k-i}$ obtained from different servers in the sets of racks 412A-412B as described above. For example, the data collected by the failure prediction subsystem 404 may include hardware metrics such as CPU utilization, temperature, latency, and memory consumption and software metrics such as error rate, memory errors, kernel errors, and latency. As described above, this information may be used as an input to a predictive model of the failure prediction subsystem 404 to generate an MTBF for the server computer systems in the sets of racks 412A-412B.

The failure prediction subsystem 404 may be software or executable code executed by the servers in the sets of racks 412A-412B or other computing resources to obtain server metrics information $406_{k-i}$ generated by the servers in the sets of racks 412A-412B and determine an MTBF for the servers in the sets of racks 412A-412B as described above in conjunction with FIG. 1. The sets of racks 412A-412B may be physical hardware that hosts one or more servers or, in some embodiments, is simply a logical grouping of the one or more servers. Examples of logical groupings, other than by rack, may include servers grouped together based on data center location, servers in different fault isolation groups (i.e., logical divisions of resources such that failure of one fault zone may not affect servers in the other zones; e.g., grouped by geographic regions, data centers, hard drive clusters, backup generators, etc.), servers grouped together based on performance characteristics (e.g., throughput, input/output operations per second, etc.), and so on. The servers in a rack may be members of a particular network. In some implementations, multiple racks of servers may be members of the same network. For example, as illustrated in FIG. 4, the servers of the set of racks 412A share the network 426A. Likewise, the servers of the set of racks 412B share the network 426B.

The networks 426A-426B may be data communication pathways between one or more electronic devices. The networks 426A-426B may be wired or wireless networks and may use any of a variety of communications protocols for organizing their network traffic. The networks 426A-426B may allow the sharing of files, data, and other types of information between the one or more electronic devices accessible through the data communication pathways. Each of the networks 426A-426B may be associated with a router, such as an aggregation router that aggregates the servers of the respective set of racks into the common network, separate from the router associated with the other network. Each of the networks 426A-426B may be on a different subnet than the other network. For example, as illustrated in FIG. 4, the servers of the set of racks 412A may be commonly connected to a router 428A. Similarly, the servers of the set of racks 412B may be commonly connected to a router 428B. The routers 428A-428B may be networking devices that forward packets between computer networks, such as between the networks 426A-426B.

As described above, the failure prediction subsystem 404 may obtain server metrics information $406_{k-i}$ and store the server metrics information $406_{k-i}$ for use in predicting the MTBF for the servers in the sets of racks 412A-412B. The failure prediction subsystem 404 may obtain the server metrics information $406_{k-i}$ directly from the servers and computing resources located in the environment 400 or may obtain the server metrics information $406_{k-i}$ from computer systems and services responsible for managing the servers and computing resources located in the environment 400. For example, a placement service of a block-level storage service may place partitions of customer volumes on various services of the set of racks 412A-412B and the failure prediction subsystem 404 may query the placement service of the block-level storage service to obtain server metrics information $406_{k-i}$ corresponding to the location of customer volumes.

Furthermore, the failure prediction subsystem 404 may also include a data warehouse or data storage system that stores the server metrics information $406_{k-i}$ such that the server metrics information $406_{k-i}$ may be queried. In this manner, the placement system may be able to query the server metrics information $406_{k-i}$ for information as well as being provided information corresponding to the server metrics information $406_{k-i}$ through a data stream or other mechanism for providing the data to the failure prediction subsystem 404. The failure prediction subsystem 404 may include logic, such as software or other executable code that, when executed by a server computer system, implements one or more predictive models (e.g., predictive models generated by at least training one or more machine learning algorithms) that determines, based at least in part on the server metrics information $406_{k-i}$, an MTBF for server computer systems in the set of racks 412A-412B. As described above, the server metrics information $406_{k-i}$ or a portion thereof may be used to train the machine learning algorithms.

Furthermore, in some embodiments, the server metrics information $406_{k-i}$ may be used to determine servers in the set of racks 412A-412B that customer data may be transferred. In one example, data maintained by a particular server must be transferred to another server prior to the server being decommissioned in response to an MTBF generated by the failure prediction subsystem 404. The data storage service 402 or component thereof such as the management subsystems as described above, may utilize the server metrics information $406_{k-i}$ to determine one or more other servers to transfer the data. If no free space is available the data storage service 402 may generate an exception indicating that there is insufficient capacity to transfer the data to another server in the set of racks 412A-412B. In various embodiments, the MTBF generated by the failure prediction subsystem 404 is used to determine when to add additional capacity (e.g., server computer systems and or racks to the set of racks 412A-412B) to the environment 400.

Figure 5:
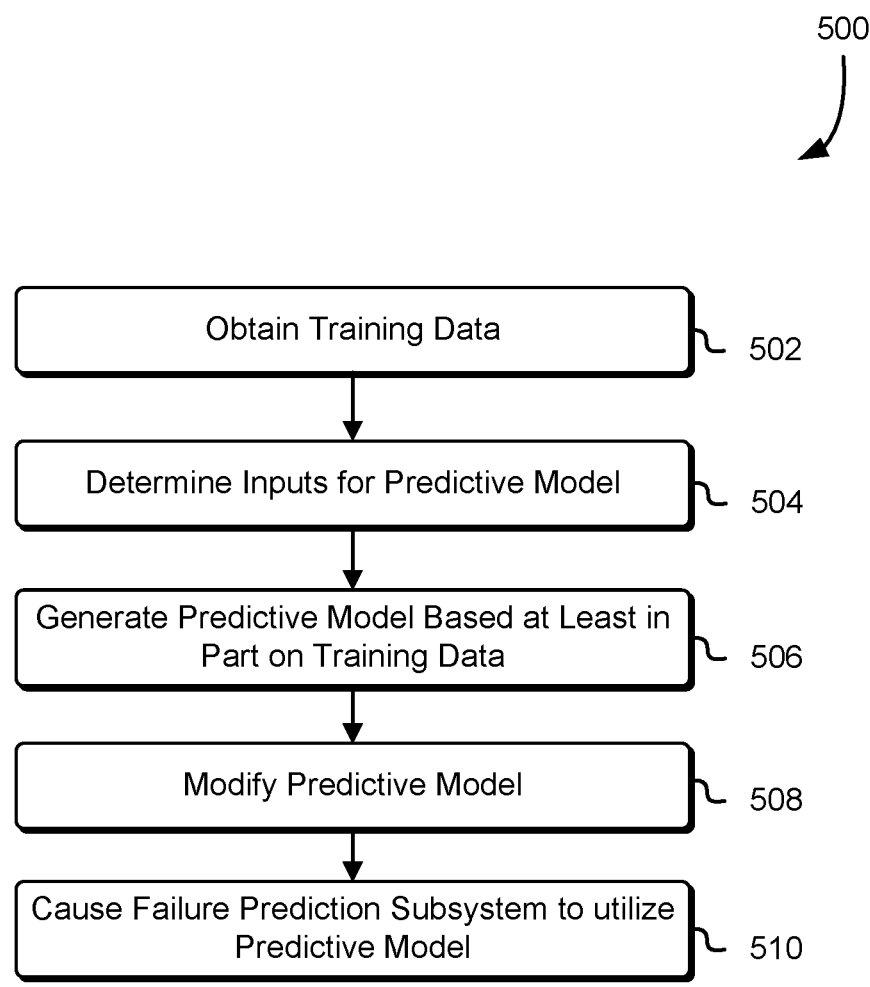
FIG. 5 shows an illustrative process which may be used to train a predictive model used to predict a mean time between failure for computing resources of a service in accordance with an embodiment.

FIG. 5 is a block diagram illustrating an example of a process 500 for training a predictive model based at least in part on a machine learning algorithms using a training data set in accordance with at least one embodiment. Some or all of the process 500 (or any other processes described, or variations and/or combinations of those processes) may be performed under the control of one or more computer systems, including executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of the process 500 may be performed by any suitable system, such as a server in a data center, by various components of the environment 100 described in conjunction with FIG. 1, such as the failure prediction subsystem, by multiple computing devices in a distributed system of a computing resource service provider or by a service provided by a computing resource service provider. The process 500 includes a series of operations which result in generating a predictive model that may be used to determine an MTBF for various server computer systems or components thereof as described above. For example, the process 500 includes obtaining training data 502. The training data, as described above, may be obtained servers in set of racks, computing resources operating a service, or data stores. In addition, the training data may be curated to improve the accuracy of the predictive model to determine the MTBF. In various embodiments, the historical metrics of a fleet of computing resources is used as the training data. In yet other embodiments, the training data may include data used by the failure prediction subsystem to generate an MTBF. In other words, the predictive model may be trained and/or updated while being used to generate predictions of the MTBFs.

In step 504, the failure prediction subsystem determines inputs for the predictive model. In one example, an engineer examiners the training data and determines inputs to the predictive model based at least in part on the training data. In another example, the predictive model subsystem determines correlations between data points included in the training data and failure of various computing resources and determines the inputs based at least in part on the correlations. In various embodiments, certain types of data may be more strongly correlated with future failure of particular types of computing resources. In one example, temperature and seek time of a HDD drive may have a stronger correlation to future failure (e.g., as temperature and seek time increase the likelihood of failure increases) for HDDs. In another example, memory errors, CPU utilization, and kernel errors may have a stronger correlation to future failure of a server computer system. In various embodiments, the failure prediction subsystem determines inputs and/or weights associated with inputs to include in the predictive model to increase the accuracy of the predictions of the predictive model.

In step 506, the failure prediction subsystem generates the predictive model based at least in part on the training data. As described above, various machine learning algorithms may be used to generate a predictive model that takes metrics information as inputs and determines an MTBF based at least in part on the inputs. In one example, a Bayesian network algorithm is used to generate a predictive model. The Bayesian network algorithm uses the training data to determine a footprint, pattern, or other information indicating that a server computer system will fail at some point in time.

In step 508, the failure prediction subsystem may modify the predictive model. For example, if the failure prediction subsystem is using a supervised machine learning algorithm an engineer may modify the predictive model. Modify the predictive model may include modifying a weight associated with one or more inputs to the predictive model, adding and/or removing inputs to the predictive model, or other operations that modify an output of the predicative model. In step 510, the failure prediction subsystem may utilize the predictive model to determine an MTBF for server computer systems. As described in greater detail below, the failure prediction subsystem may obtain metrics information from server computer systems and determine an MTBF for the server computer systems. Note that one or more of the operations performed in 502-510 may be performed in various orders and combinations, including in parallel. For example, the training data may be streamed to the failure prediction subsystem while the failure prediction subsystem is generating the predictive model based at least in part on the training data. In numerous variations to the process 500, one or more of the operations 502-510 may be omitted or performed by other systems of services. For example, in various embodiments, the failure prediction subsystem may omit modifying the predictive model.

Figure 6:
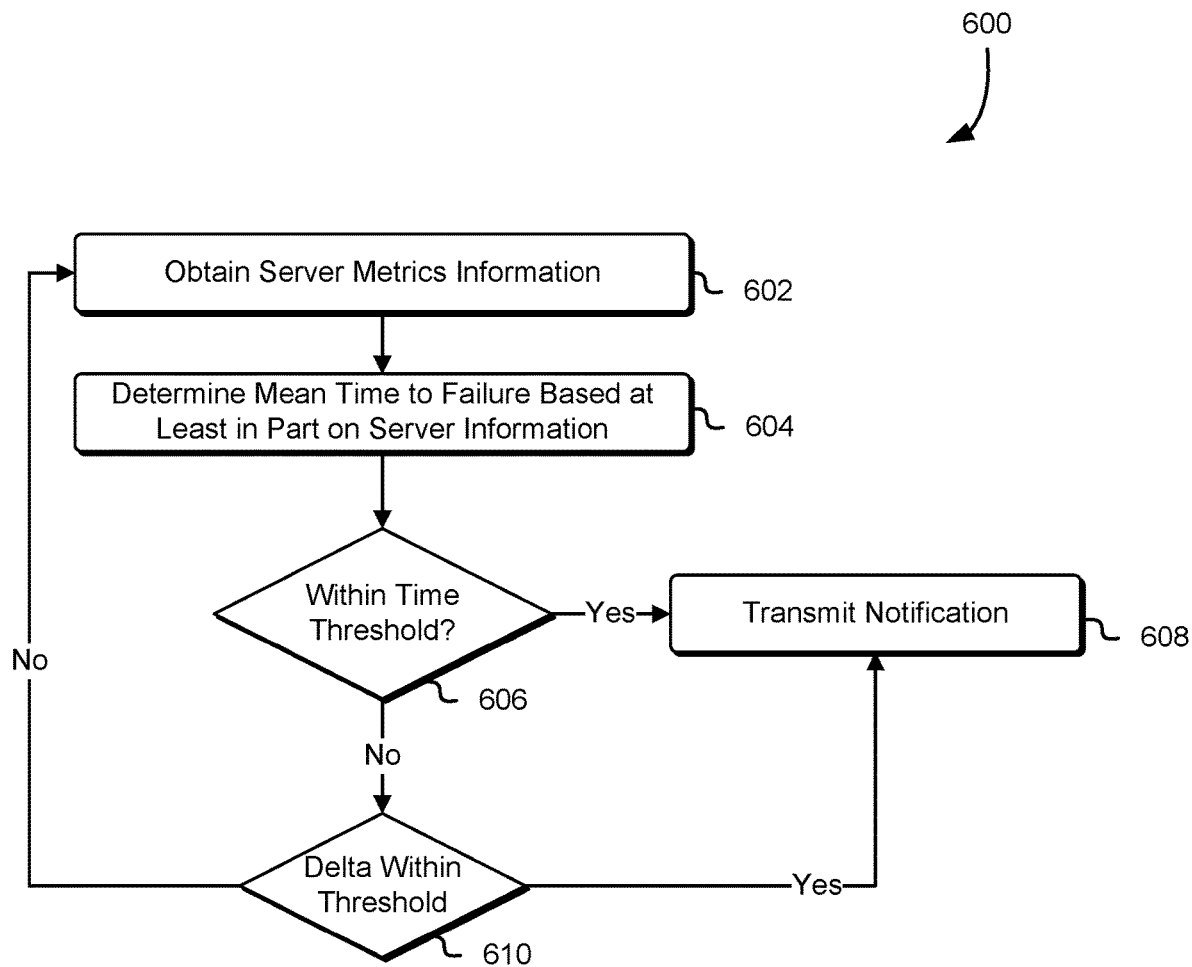
FIG. 6 shows an illustrative process which may be used to predict a mean time between failure for computing resources of a service in accordance with an embodiment.

FIG. 6 is a block diagram illustrating an example of a process 600 for generating an MTBF for a server computer system in accordance with at least one embodiment. Some or all of the process 600 (or any other processes described, or variations and/or combinations of those processes) may be performed under the control of one or more computer systems, including executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of the process 600 may be performed by any suitable system, such as a server in a data center, by various components of the environment 100 described in conjunction with FIG. 1, such as the failure prediction subsystem, by multiple computing devices in a distributed system of a computing resource service provider or by a service provided by a computing resource service provider. The process 600 includes a series of operations which result in determining a set of MTBFs for a set of server computer systems and transmitting an appropriate notification. For example, the process 600 includes obtaining server computer system metrics information 602. As described above, the server metrics information may include hardware metrics and software metrics of a set of server computer systems. Furthermore, in various embodiments, the server metrics information may be aggregated server metrics information. However, in such embodiments, the metrics information included in the aggregated server metrics information may be identifiable as being obtained from a particular server computer system. In this manner, the failure prediction subsystem may obtain aggregated server metrics information but still be capable of determine an MTBF for each server of the set of servers included in the aggregated metrics information. Furthermore, as described above, the server metrics information may be obtained as a stream of data. As such, the failure prediction subsystem may periodically or aperiodically generate an update to the MTBF for a particular server computer system. In one example, every 120 second the failure prediction subsystem obtains server metrics information and determines an MTBF.

In step 604, the failure prediction subsystem determines a set of MTBFs based at least in part on the server metrics information. In one example, the failure prediction subsystem determines an MTBF for each sever computer systems for which metrics information is included in the server metrics information. As described above, the failure prediction subsystem may utilize one or more machine learning algorithms to determine the MTBF including predictive models generated using the one or more machine learning algorithms. In one example, the failure prediction subsystem uses a Bayesian network algorithm to train a predictive model that is provided with the server metrics information as an input and outputs an MTBF for a particular server associated with the server metrics information. In various embodiments, a plurality of machine learning algorithms and/or predictive models may be used and the plurality of MTBF may be combined using various statistical methods (e.g., average or mean).

In step 606, the failure prediction subsystem determines if the MTBF is within a threshold. In one example, the failure prediction subsystem determines if the MTBF is within a threshold value of an amount of time required to decommission the server computer system. Other values may be used to determine whether the MTBF indicates that mitigating actions should be performed. In one example, if the MTBF falls below zero seconds then the threshold is determined to be reached. If the MTBF is within the threshold, the failure prediction subsystem proceeds to step 608 and transmits a notification. The notification may cause various operations to be performed. For example, as described above the notification may cause the management subsystem to update the metadata associated with the data storage server to indicate the data storage server is being decommissioned. Furthermore, as described above, decommissioning a server may cause the data maintained by the server to be copied to one or more other servers. The notification may be transmitted to various endpoints that may be responsible for performing one or more mitigating operations. In one example, the notifications transmitted to an engineer responsible for repairing and/or replacing the server computer system. In various embodiments, components of the server computer system are repaired and/or replaced without decommissioning the server computer system.

If the failure prediction subsystem determines that the MTBF is not within the threshold, the failure prediction subsystem continues to step 610 and determines whether a delta (e.g., the change between successive MTBFs) is within a second threshold. In one example, the MTBF decreases by more than 25%, the failure prediction subsystem transmits a notification and causes mitigating operations to be performed. However, if delta is not within a value of the second threshold, the failure prediction subsystem may continue with the process 600 and obtain additional server metrics information. In this manner, the failure prediction subsystem may continuously or near continuously monitor server computer systems and determine MTBFs for the server computer systems. Note that one or more of the operations performed in 602-610 may be performed in various orders and combinations, including in parallel. In numerous variations to the process 600, one or more of the operations 602-610 may be omitted or performed by other systems of services.

Figure 7:
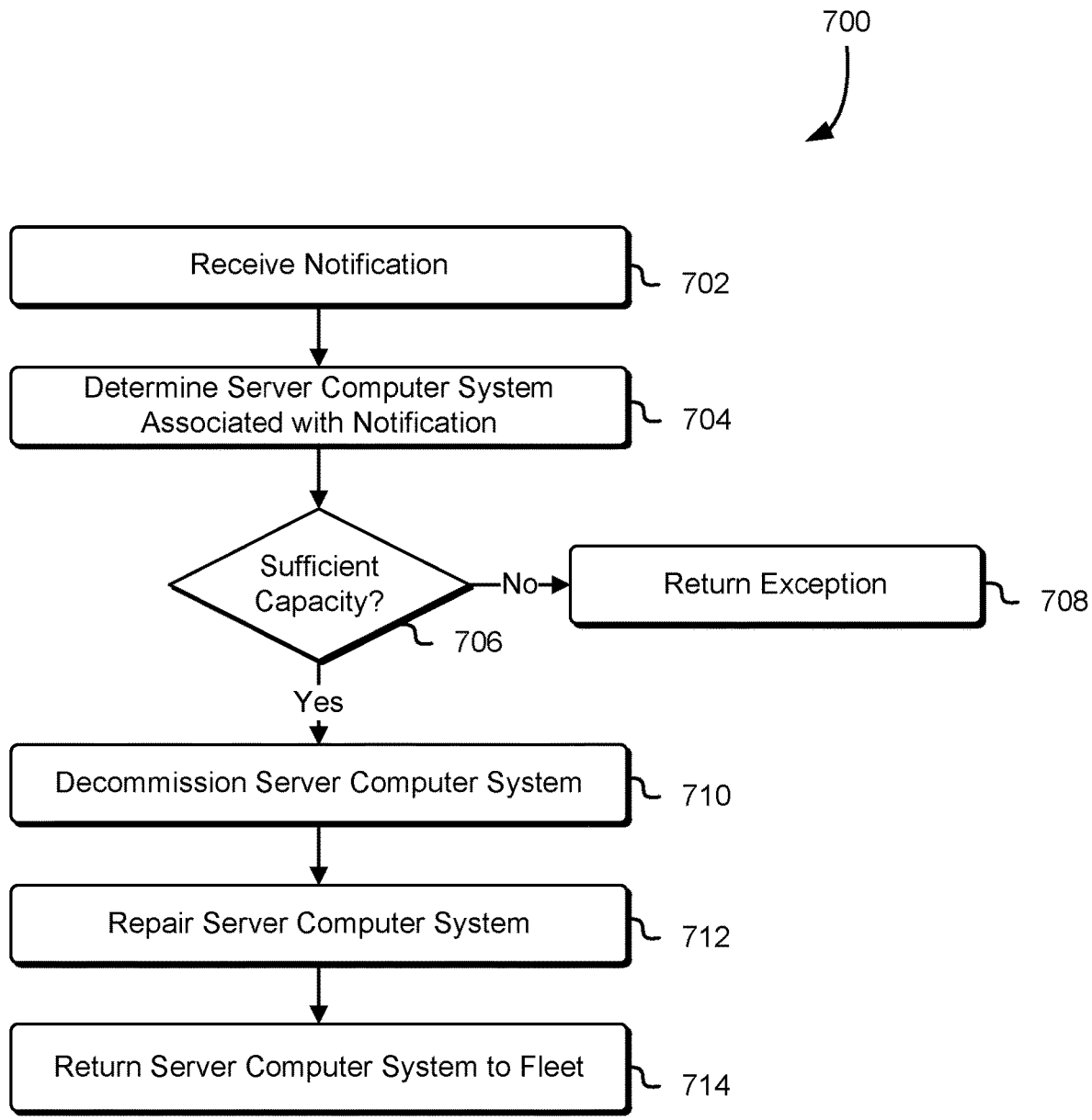
FIG. 7 shows an illustrative process which may be used to repair computing resources of a service in response to a predicted mean time between failure in accordance with an embodiment.

FIG. 7 is a block diagram illustrating an example of a process 700 for replacing and/or repairing a server computer system in response to a notification generated based at least in part on a predicted MTBF of the server computer system in accordance with at least one embodiment. Some or all of the process 700 (or any other processes described, or variations and/or combinations of those processes) may be performed under the control of one or more computer systems, including executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of the process 700 may be performed by any suitable system, such as a server in a data center, by various components of the environment 100 described in conjunction with FIG. 1, such as the management subsystem, by multiple computing devices in a distributed system of a computing resource service provider or by a service provided by a computing resource service provider. The process 700 includes a series of operations which result in repairing or replacing a host computer system. For example, the process 700 includes receiving a notification 702. The notification may include a notification transmitted based at least in part on a predicted MTBF as described above in connection with at least FIG. 6. The notification, in various embodiments, indicates a server computer system or component thereof that should be repaired and/or replaces and the predicted MTBF.

In step 704, the management subsystem determines a server computer system associated with the notification. In one example, the notification may indicate that a particular HDD need to be replace, the management subsystem may then determine a server and/or rack where the particular HDD is located. In step 706, the management subsystem may determine if there is sufficient capacity in a fleet of server computer systems to decommission the server computer system. For example, as described above in connection with FIG. 4, the server computer system may be located in a data center containing a plurality of other server computer systems. Furthermore, decommissioning the host, in some embodiments, is required to repair and/or replace the server computer system and to avoid losing data the data maintained by the server computer system must be copied to another server computer system.

Returning to FIG. 7, if the management system determines that there is insufficient capacity, the management subsystem may return an exception 708. The exception, as described above, may indicate that there is insufficient capacity to decommission the server computer system and that the server computer system may not be repaired. In response to the exception, in some embodiments, addition capacity may be added to the fleet. In yet other embodiments, the exception is provided to an operator, engineer, or other entity responsible for the supervision and management of the server computer systems. However, if the management subsystem determines that there is sufficient capacity, the management subsystem may continue to step 710 and decommission the server computer system. In various embodiments, the management subsystem generates a service call to decommission the server computer system that causes one or more workflows to be executed to copy the data from the server computer system to one or more other server computer system.

In step 712, the server computer system is repaired. Repairing the server computer system may include replacing a particular hardware component, updating software, restarting the server computer system, repairing a particular hardware component, or any other operation required to mitigate a predicted failure, failing component, or a failed component. In step 714, the server computer system may be returned to the fleet. Note that one or more of the operations performed in 702-714 may be performed in various orders and combinations, including in parallel. In one example, decommissioning the server computer system and repairing the server computer system is performed in parallel. In numerous variations to the process 700, one or more of the operations 702-714 may be omitted or performed by other systems of services. In one example, the server computer systems are capable of being repaired without requiring decommissioning therefore step 710 is omitted. As described in the present disclosure, the server computer system may perform a variety of operations such as store data on behalf of a customer of a computing resource service provider and/or provide computational resources for those same customers.

Figure 8:
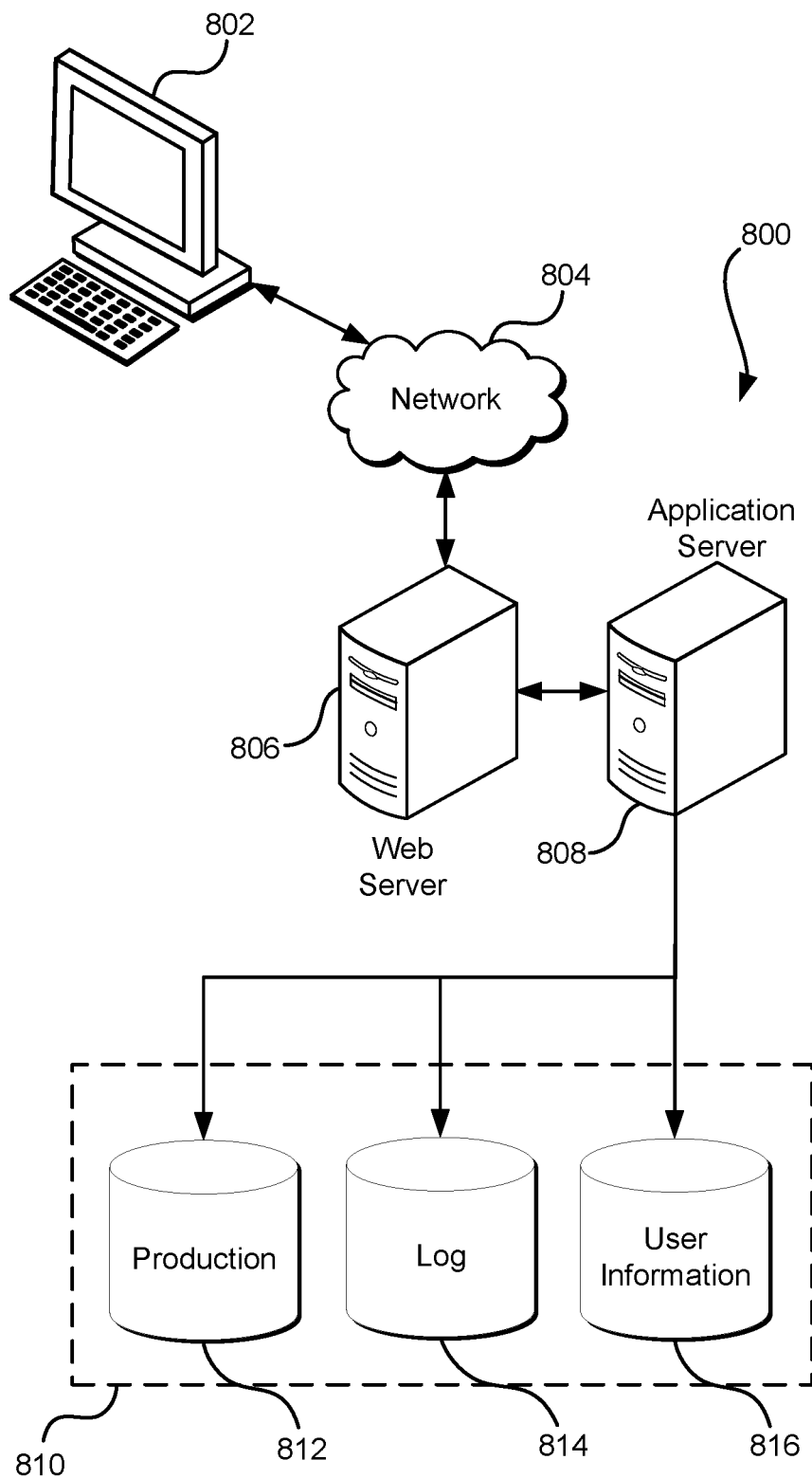
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages, or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 802 and the application server 808, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C # or C++, or any scripting language, such as Ruby, PHP, Perl, Python or TCL, as well as combinations thereof. The server(s) may also include database servers, including without limitation those commercially available from Oracle®, Microsoft®, Sybase and IBM® as well as open-source servers such as My SQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   obtaining aggregated server metrics for a plurality of data storage servers that implement a data storage service provided by a computing resource server provider;
   determining a first set of hardware metrics and a first set of software metrics to provide as inputs to a machine learning algorithm, the first set of hardware metrics including a first portion of the aggregated server metrics associated with hardware information of a data storage server of the plurality of data storage servers and the first set of software metrics including a second portion of the aggregated server metrics associated with software executed by the data storage server;
   generating a predictive model by at least providing as inputs, to the machine learning algorithm, the first set of hardware metrics and the first set of software metrics, the predictive model used to generate a mean time between failure (MTBF) of the data storage server;
   generating the MTBF of the data storage server by at least providing as inputs a second set of hardware metrics and a second set of software metrics, the second set of hardware metrics including a third portion of the aggregated server metrics associated with hardware information of the data storage server of the plurality of data storage servers and the second set of software metrics including a fourth portion of the aggregated server metrics associated with software executed by the data storage server;
   determining a mitigating operation to perform based at least in part on the MTBF being within a value of a threshold and determining that a difference between the MTBF and at least one other previously determined MTBF is within the value of a second threshold; and
   performing the mitigating operation, wherein the mitigating operation causes a management subsystem of the data storage service to initiate a workflow.

2. The computer-implemented method of claim 1, wherein the aggregated server metrics further comprise a data stream provided by a stream service.

3. The computer-implemented method of claim 1, wherein the workflow, if successfully completed, causes the data storage server to be decommissioned, based at least in part on the MTBF indicating that a first amount of time before a predicted failure is within the value of the threshold, where the threshold is associated with a second amount of time to decommission data storage servers.

4. The computer-implemented method of claim 1, further comprising determining the mitigating operation based at least on a rate of change of the MTBF exceeding a third threshold.

5. A system, comprising:
   one or more processors; and
   memory that stores computer-executable instructions that, as a result of execution by the one or more processors, cause the system to:
      obtain metrics information from a server, the metrics information including operational information obtained from the server indicating various measurements of hardware of the server and software executed by the server;
      use a predictive model to generate information that indicates an upcoming failure of the server by at least:
         providing, as an input to the predictive model, metrics information associated with the server; and
         obtaining the information as an output of the predictive model;
      determine that there is insufficient capacity to decommission the server based at least in part on an amount of capacity of a set of servers to store data from the server;
      transmit a notification indicating that there is insufficient capacity to decommission the server; and
      cause a management subsystem to initiate a workflow to add storage capacity to the set of servers.

6. The system of claim 5, wherein the system includes a data storage server that implements a data storage service of a computing resource service provider that provides logical volumes to customers of the computing resource service provider.

7. The system of claim 5, wherein the computer-executable instructions further cause the system to generate the predictive model using a Bayesian network machine learning algorithm.

8. The system of claim 5, wherein the computer-executable instructions further cause the system to update metadata associated with the server to indicate that the server is being decommissioned.

9. The system of claim 8, wherein the computer-executable instructions further cause the system to update the metadata associated with the server to indicate that the server is no longer being decommissioned.

10. The system of claim 5, wherein the metrics information includes a set of hardware metrics including at least one of temperature, processor utilization, memory consumption, memory error rate, latency, or seek time.

11. The system of claim 5, wherein the metrics information includes a set of software metrics including at least one of kernel errors, memory errors, or end-to-end latency.

12. The system of claim 5, wherein the the workflow is performed as a result of a change of the metrics information between successive determinations.

13. A non-transitory computer-readable storage medium storing thereon executable instructions that, as a result of execution by one or more processors of a computer system, cause the computer system to at least:
   obtain a set of metrics from a data storage server implementing a data storage service, the set of metrics including values generated based at least in part on measurements of operations of hardware and software of the data storage server;

cause a predictive model to generate information indicating an upcoming failure of the data storage server by at least providing a second subset of the set of metrics as an input to the predictive model; and determine the information is within a value of a threshold, based at least in part on an amount of time required to copy data from the data storage server to at least one other data storage server; and perform, as a result of the information being within the value of the threshold, a mitigating operation that causes the data storage service to initiate a workflow.

14. The non-transitory computer-readable storage medium of claim 13, wherein the executable instructions, as a result of execution by the one or more processors, cause the computer system to train the predictive model based at least in part on a neural network algorithm generated based at least in part on historical data of a plurality of data storage servers indicating a set of footprints associated with failures of the plurality of data storage servers.

15. The non-transitory computer-readable storage medium of claim 14, wherein the executable instructions that cause the computer system to cause the predictive model to generate the information further include instructions that cause the computer system to cause the predictive model to generate additional information indicating an additional upcoming failure of a particular data storage server of the plurality of data storage servers.

16. The non-transitory computer-readable storage medium of claim 13, wherein the executable instructions that cause the computer system to cause the predictive model to generate the information further include instructions that cause the computer system to cause the predictive model to generate the information for a particular hard disk drive included in the data storage server.

17. The non-transitory computer-readable storage medium of claim 13, wherein the executable instructions that cause the computer system to obtain the set of metrics further include instructions that cause the computer system to obtain hardware metrics and software metrics from a set of logs generated by the data storage server.

18. The non-transitory computer-readable storage medium of claim 13, wherein the executable instructions that cause the computer system to obtain the set of metrics further include instructions that cause the computer system to obtain hardware metrics and software metrics from a stream service of a computing resource service provider.

19. The non-transitory computer-readable storage medium of claim 13, wherein the executable instructions, as a result of execution by the one or more processors, cause the computer system to determine to add additional data storage servers to a plurality of data storage servers based at least in part on the information and an amount of capacity of the data storage server.

20. The non-transitory computer-readable storage medium of claim 13, wherein the executable instructions, as a result of execution by the one or more processors, cause the computer system to perform the mitigating operation as a result of a decrease in successive values within a second threshold.

* * * * *